(12) United States Patent
Lietonen et al.

(10) Patent No.: US 12,312,814 B2
(45) Date of Patent: May 27, 2025

(54) ARRANGEMENT

(71) Applicant: Sandvik Mining and Construction Oy, Tampere (FI)

(72) Inventors: Jani Lietonen, Turku (FI); Esko Laihonen, Turku (FI)

(73) Assignee: Sandvik Mining and Construction Oy, Tampere (FI)

( * ) Notice: Subject to any disclaimer, the term of this patent is extended or adjusted under 35 U.S.C. 154(b) by 453 days.

(21) Appl. No.: 17/636,135

(22) PCT Filed: Aug. 19, 2019

(86) PCT No.: PCT/EP2019/072132
§ 371 (c)(1),
(2) Date: Feb. 17, 2022

(87) PCT Pub. No.: WO2021/032276
PCT Pub. Date: Feb. 25, 2021

(65) Prior Publication Data
US 2022/0290564 A1    Sep. 15, 2022

(51) Int. Cl.
*E04F 11/18* (2006.01)
*E21F 13/02* (2006.01)

(52) U.S. Cl.
CPC ......... *E04F 11/1865* (2013.01); *E21F 13/025* (2013.01); *Y10T 403/32336* (2015.01)

(58) Field of Classification Search
CPC ............. E04G 21/3228; E04F 11/1865; Y10T 403/32336; E21F 13/025
See application file for complete search history.

(56) References Cited

U.S. PATENT DOCUMENTS

| | | | | |
|---|---|---|---|---|
| 4,577,986 A | * | 3/1986 | Wang | E06C 1/32 16/349 |
| 4,759,437 A | | 7/1988 | Bevins | |
| 5,732,911 A | * | 3/1998 | Kulp | E01F 9/688 40/607.1 |
| 6,102,479 A | * | 8/2000 | Wallace | A47C 7/66 403/93 |

(Continued)

FOREIGN PATENT DOCUMENTS

| | | | | |
|---|---|---|---|---|
| FR | 2 934 624 | * | 2/2010 | ......... E04G 21/3223 |
| FR | 2989714 A1 | | 10/2013 | |

(Continued)

*Primary Examiner* — Michael P Ferguson
(74) *Attorney, Agent, or Firm* — Corinne R. Gorski

(57) ABSTRACT

An arrangement for attaching a falling post on a base structure, the post being rotatably movable between a standing and a recumbent position. The arrangement includes a stand, wherein the post is attached pivotally to the stand by a pin. The stand includes at least one groove arranged laterally in respect to the post, and the post has at least one projection extending in a lateral direction from the post. The at least one groove is arranged with respect to the at least one projection such that when the stand is in the standing position, the at least one projection lies in the at least one groove, and thereby locks the post in the standing position. The at least one projection is attached to the post such that it may move with respect to the stand in a longitudinal direction of the post.

13 Claims, 6 Drawing Sheets

(56) References Cited

U.S. PATENT DOCUMENTS

| | | | |
|---|---|---|---|
| 7,243,450 B2 * | 7/2007 | Dicke | G09F 15/0056 |
| | | | 40/607.1 |
| 9,233,646 B2 * | 1/2016 | Koshy | E04H 17/1417 |
| 9,487,145 B2 | 11/2016 | Koshy | |
| 10,100,564 B2 | 10/2018 | Lapchev | |
| 2008/0122211 A1 * | 5/2008 | Kang | B60R 3/005 |
| | | | 280/762 |

FOREIGN PATENT DOCUMENTS

| | | |
|---|---|---|
| GB | 926289 A | 5/1963 |
| WO | 2016/041017 A1 | 3/2016 |

* cited by examiner

ARRANGEMENT

RELATED APPLICATION DATA

This application is a § 371 National Stage Application of PCT International Application No. PCT/EP2019/072132 filed Aug. 19, 2019.

BACKGROUND

The invention relates to an arrangement for attaching a falling post on a base structure.

The invention further relates to a vehicle comprising the arrangement.

Safety railings that can be tilted from their standing position to a lower or recumbent position are widely used in vehicles that have to move in narrow passages. One example of such vehicles are vehicles used in mines. The safety railings are required e.g. during service and maintenance work of a vehicle when personnel has to work on the vehicle, but on the other hand, standing safety railings are vulnerable to be damaged when the vehicle moves in a mine.

A problem with known tilting safety railings is that the tilting operation is complicated and typically not executed by one operator.

BRIEF DESCRIPTION

Viewed from a first aspect, there can be provided an arrangement for attaching a falling post on a base structure, the post being rotatable movable between a standing and a recumbent position, the arrangement comprising a stand, comprising attachment element for attaching the falling post to said base structure, the post attached pivotally to the stand by a pin, the post having an ability to rotate from the standing position to the recumbent position in respect of the stand, the stand comprising at least one groove arranged laterally in respect of the post, the post comprising at least one projection extending in a lateral direction from the post, said at least one groove being arranged in respect of said at least one projection such that when the stand is in the standing position, the at least one projection lies in the at least one groove, and thereby locks the post in said standing position, the at least one projection being attached to the post such that it has an ability to move in respect of the stand in a longitudinal direction of the post an exterior of the stand comprises a guidance surface ending to the at least one groove, and arranged to lift the at least one projection and guide said projection to move in the at least one groove, the arrangement further comprising a lever attached rotatable in the stand, the lever including a first end, length of which is arranged to extend past the guidance surface when the post is in the recumbent position such that the at least one projection arranged to move on the guidance surface is adapted to push the first end of the lever and rotate the lever in first direction therewith, and the at least one projection arranged to push down the first end simultaneously with moving into the at least one groove, such that the post being in the standing position the first end of the lever is situated under the at least one projection lying in the at least one groove, and wherein the lever being activated to rotate in a second direction opposite to the first direction, the first end of the lever is adapted to lift the at least one projection away from the at least one groove, thus allowing the post being moved towards the recumbent position.

Thereby a safety railing that is simple and easy to operate may be achieved.

Inventive embodiments are also disclosed in the specification and drawings of this patent application. The inventive content may also be formed of several separate inventions, especially if the invention is examined in the light of expressed or implicit sub-tasks or in view of obtained benefits or benefit groups. Features of the different embodiments of the invention may, within the scope of the basic inventive idea, be applied to other embodiments.

In one embodiment, the at least one projection is arranged in the post movable in longitudinal direction of said post, preferably connected with an actuator arranged in the post and adapted to urge said projection towards the pin and allow said projection being lifted by the guidance surface to move away from the pin. An advantage is that the structure of the post is simple.

In one embodiment, the at least one projection is arranged fixedly in the post, the stand comprises vertically elongated mounting holes for receiving the pin attached to the post, such that the guidance surface is arranged to lift the pin and the post therewith in guidance of said elongated mounting hole. An advantage is that structure of the arrangement is simple.

In one embodiment, the at least one projection is arranged fixedly in the post, the post comprises vertically elongated mounting hole for receiving the pin attached to the stand, such that the guidance surface is arranged to lift the post therewith in guidance of said elongated mounting hole. An advantage is that structure of the arrangement is simple.

In one embodiment, the stand comprises two grooves arranged opposite sides of the stand, and respectively, the post comprises two projections extending opposite directions from the post. An advantage is that a symmetrical and self-adaptable structure may be achieved.

In one embodiment, an upper section of the guidance surface has a convex profile. An advantage is that a continuously smooth movement of the projection may be achieved.

In one embodiment, the at least one groove comprises a rear edge that extends higher from the bottom of the groove than a front edge joining to the guidance surface. An advantage is that a simple means for stopping the movement of the projection may be achieved.

In one embodiment, as the lever is in its extreme position in a second direction of rotation, the first end of the lever is arranged to lie at the at least one groove, such that said first end is limiting length of the at least one groove to a length shorter than width of the projection, the lever thus prohibiting the projection entering in the groove. An advantage is that a simple structure for facilitating of handling of long safety railings may be achieved.

In one embodiment, the lever being dimensioned such that as the first end is limiting said length of the at least one groove to a length shorter than width of the projection, the second end of the lever is lying on the same side with the first end with relation to a vertical imaginary plane arranged in and parallel with a rotational pin of the lever. An advantage is that unintentional movement of the lever may be prevented.

In one embodiment, the lever comprises two first ends and an arc-like connecting piece therebetween, said arc-like connecting piece establishing the second end of the lever. An advantage is that a symmetrical and sturdy structure of the lever may be achieved.

In one embodiment, the lever comprises an extension extending to an opposite side of the stand as the second end of the lever. An advantage is that the arrangement can be operated easily from both sides of the safety railing.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
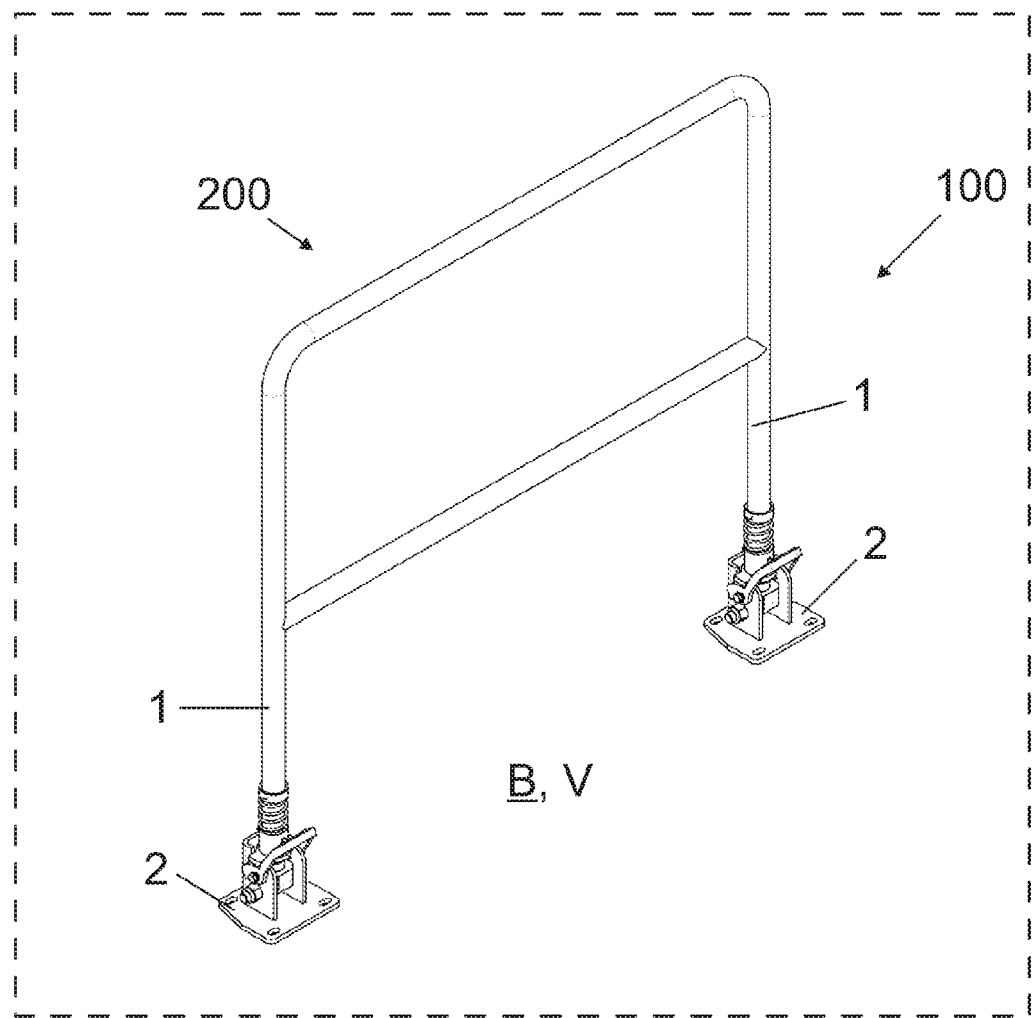
FIG. 1 is a schematic view of a safety railing comprising an arrangement for attaching a falling post of the invention.

FIG. 1 is a schematic view of a safety railing 200 comprising an arrangement 100 for attaching a falling post of the invention and arranged to a vehicle V. The vehicle V is a mining vehicle or a construction vehicle. In mines and at other work sites different type of vehicles are used. The vehicles may be provided with one or more working devices for executing designed work tasks at the work site. The vehicle may be a wheel loader, a transport vehicle or dumper, a rock drilling rig, an excavator or a lifting machine, for example.

However, the vehicle V may be any other type of a utility vehicle, such as a tractor, a truck, a farming machine, a forestry machine etc.

FIGS. 2-8 are schematic perspective views of an arrangement for attaching a falling post in various positions.

The arrangement 100 comprises a stand 2 that has an attachment element 3 for attaching the falling post 1 to a base structure B. The attachment element 3 shown in figures comprises bolt holes but, of course, the attachment element may be realized various ways. The base structure B is a part or component of the vehicle V.

Figure 2:
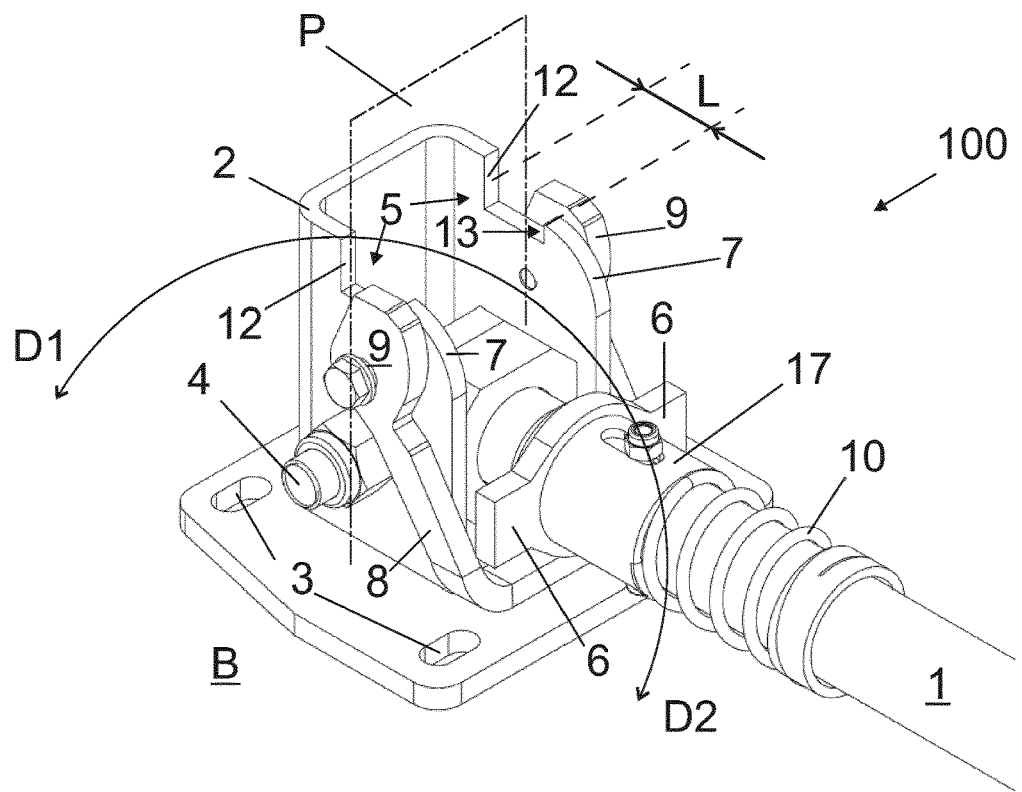
FIG. 2 is a schematic perspective view of an arrangement for attaching a falling post in a first position.
Figure 3:
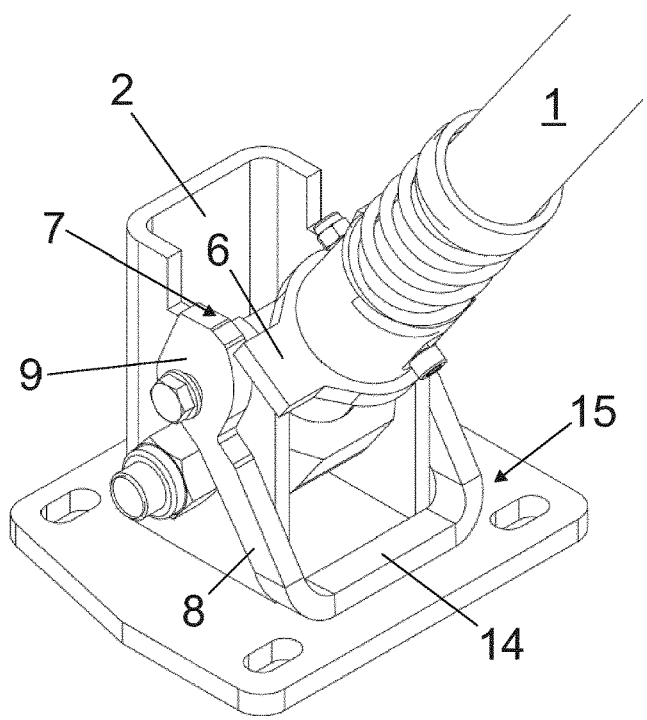
FIG. 3 is a schematic perspective view of the arrangement shown in FIG. 2 in a second position.
Figure 5:
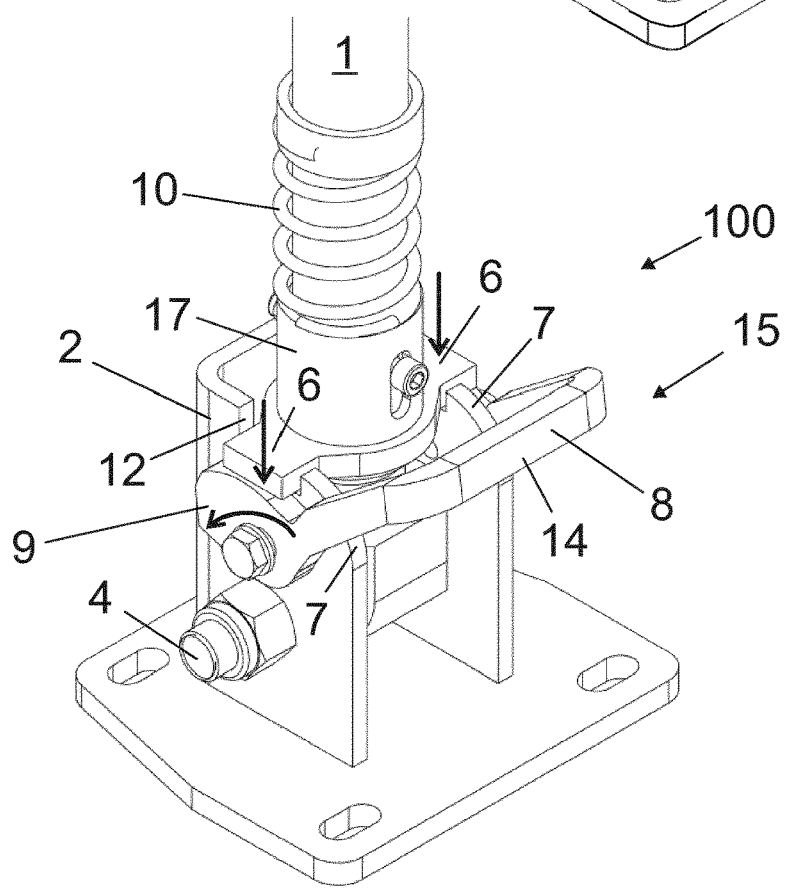
FIG. 5 is a schematic perspective view of the arrangement shown in FIG. 2 in a second position.

The post 1 is attached pivotally to the stand 2 by a pin or axle 4, the post 1 thus having an ability to rotate from a horizontal position to a vertical position, and vice versa, in respect of the stand 2. The horizontal or recumbent position is shown in FIG. 2 and vertical or standing position is shown in FIG. 5.

It is to be noted that "vertical or standing position" means here a position where the post 1 lies when the safety railing 200 is arranged for securing safety of personnel, whereas "horizontal or recumbent position" means a position where the safety railing 200 has been lowered or overturned in order to lower the height thereof.

The stand 2 comprises at least one groove 5 arranged laterally in respect of the post 1. In the embodiment shown in Figures, there are two grooves 5 arranged opposite sides of the stand 2.

The post 1 comprises at least one projection 6 extending in a lateral direction from the post 1. In the embodiment shown in Figures, there are two projections 6 extending opposite directions from the post 1.

The grooves 5 are arranged in respect of the projections 6 such that when the post 1 is in the standing position (shown in FIG. 5), the projections 6 lie in the grooves 5, and thereby locks the post 1 in the standing position and in respect of the stand 2.

The projections 6 are attached to the post 1 such that they may move in respect of the stand 2 in a longitudinal direction of the post 1. In the embodiment shown in Figures, the projections 6 are attached to a sleeve 17 that glides on the post 1. The sleeve comprises two long apertures and the post 1 a bolt and nut arranged in said apertures. The apertures and the bolt and nut limits and guides the movement of the projections 6 on the post 1. In an embodiment, an actuator 10 is arranged in the post 1. The actuator 10 is adapted to urge the projection(s) 6 towards the pin 4 and allow said projection(s) 6 being lifted by a guidance surface 7 to move away from the pin 4. In the embodiment shown in Figures, the actuator is a coil spring. However, the actuator may also be e.g. mechanical spring of another type, a gas spring etc.

In another embodiment, there are no actuator at all. Instead, the movement of the projection(s) is caused by gravity of the projections 6.

The position and shape of the guidance surface 7 is designed such that the projection(s) 6 of raising post 1 make(s) contact with a convex-shaped upper section of the guidance surface 7. This ensures a smooth and easy lift-up of the post 1, and also a reliable lifting of the projection(s) 6.

In another embodiments, the guidance surface 7 may have different shapes. In an embodiment, the shape is straight.

The exterior of the stand 2 comprises guidance surfaces 7 that end to the grooves 5. The guidance surfaces 7 are adapted to lift (see FIGS. 3 and 4) the projections 6 during movement of the post 1 from its horizontal position to the vertical position and guide said projections 6 to arranged eccentrically with respect to the convex-shaped up-per sections, such that the distance of upper part of the guidance surface 7 from the pin 4 is more than said dis-tance in lower parts of said surface 7. Due to this feature, the projections 6 move away from the pin 4 during the raising of the post 1 and, simultaneously, the actuator 10 is "primed", e.g. in case of spring, the spring is tensioned. The tension is at least partly released when the projections move in the grooves 5.

The arrangement 100 comprises further a lever 8 attached rotatable in the stand 2.

The lever 8 has a first end 9, length of which is arranged to extend past the guidance surface 7 when the post 1 is in the horizontal position. Thus the projections 6 that move on the guidance surface 7 together with raising post will 1 push the first end 9 of the lever and rotate the lever 8 in a first direction D1 therewith (shown in FIG. 2).

Figure 4:
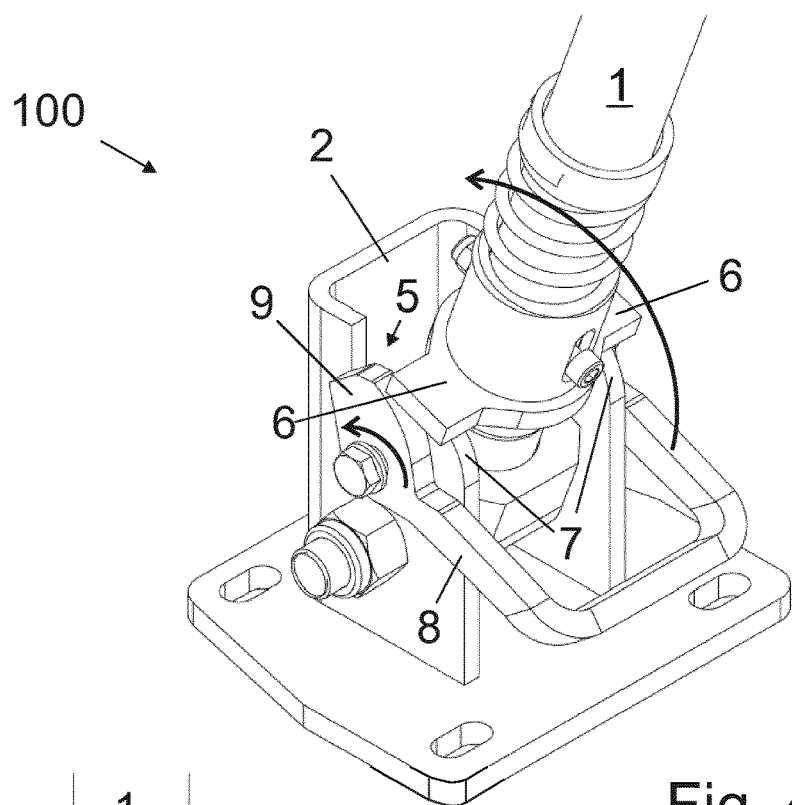
FIG. 4 is a schematic perspective view of the arrangement shown in FIG. 2 in a second position.

The projections 6 push the first ends 9 moving on the respective guidance surfaces 7 ahead (as shown in FIG. 4) until the projections 6 reach the grooves 5. Then the projections 6 move or drop into the grooves 5 and, simultaneously, push down the first ends 9 of the lever. As a result, the first ends 9 are situated under the projections settled in the grooves 5. The post 1 and the safety railing 200 is then in the standing position and locked in this position by the projections 6 in the grooves 5 as shown in FIG. 5.

The movement of the projections 6 in the first direction D1 may be stopped just above the grooves 5 by a high rear edge 12 of the groove 5. According to an idea, in embodiments comprising two projections, such as shown in Figures, the two projections centre and guide themselves against respective rear edges. Thus plays, if any, in the structure of the post and projections may be eliminated. However, it is to be noted that the high rear edge is not an essential feature of the structure.

Figure 6:
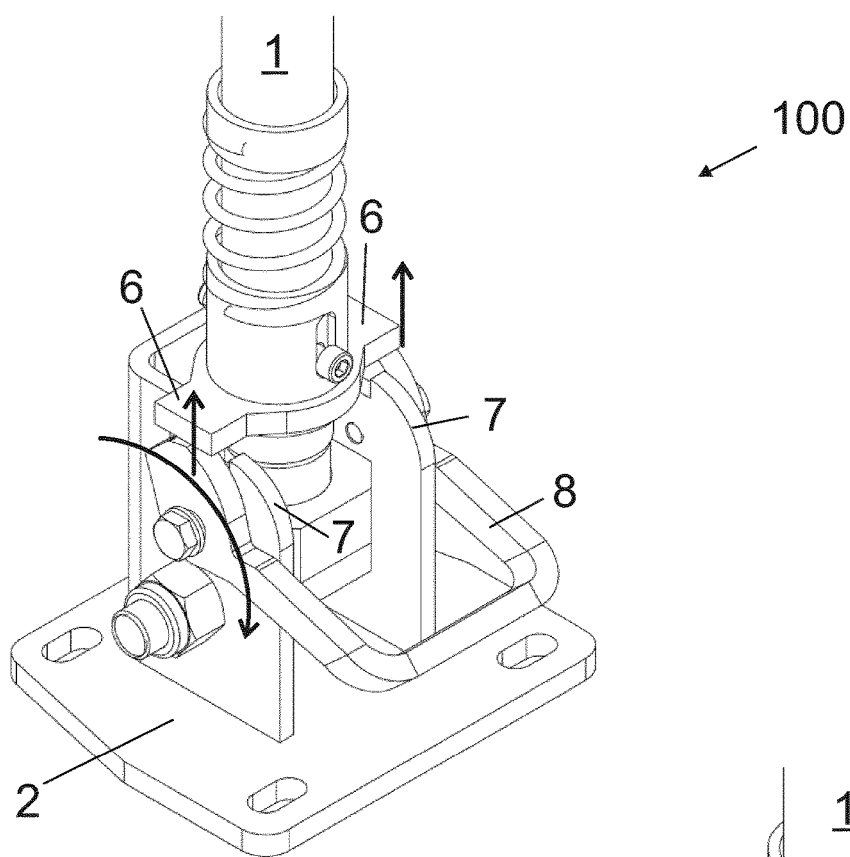
FIG. 6 is a schematic perspective view of the arrangement shown in FIG. 2 in a second position.

In a case the standing safety railing 200 has to be lowered, the lever 8 is activated to rotate in a second direction D2 opposite to the first direction. The activation may be done by pressing second end of lever 15 e.g. by foot. Then the first ends 9 of the lever are adapted to lift the projections 6 away from the respective grooves 5, as shown in FIG. 6. In this position of the projections 6, the post 1 is released and may be turn over to the horizontal position.

The lever 8 shown in Figures comprises two first ends 9 and an arc-like connecting piece 14 connecting the first ends. The arc-like connecting piece 14 establishes the second end 15 of the lever.

Figure 7:
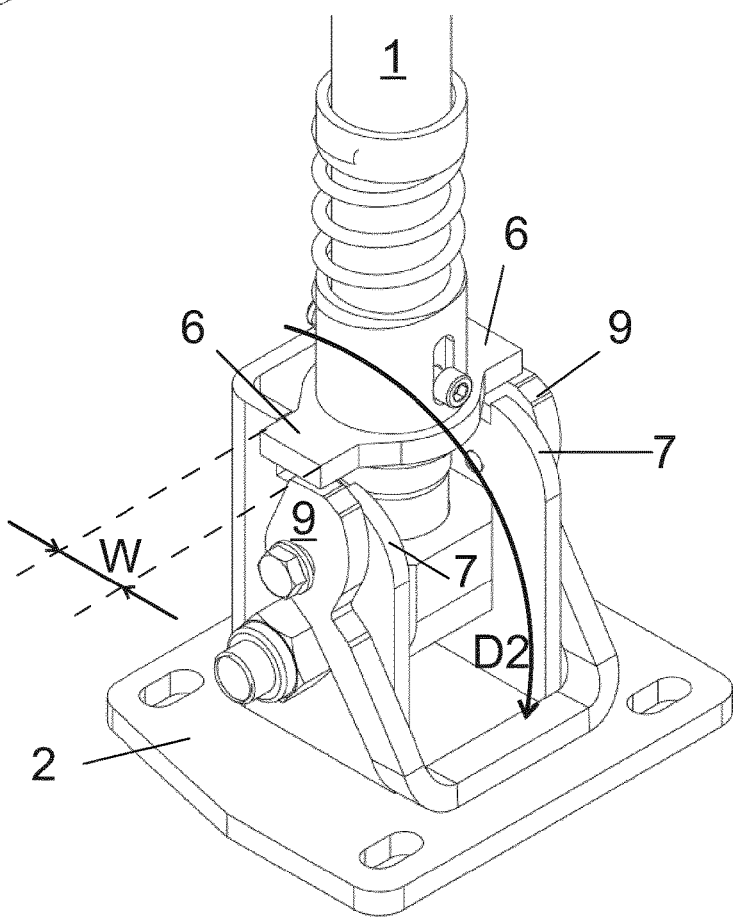
FIG. 7 is a schematic perspective view of the arrangement shown in FIG. 2 in a second position.
Figure 8:
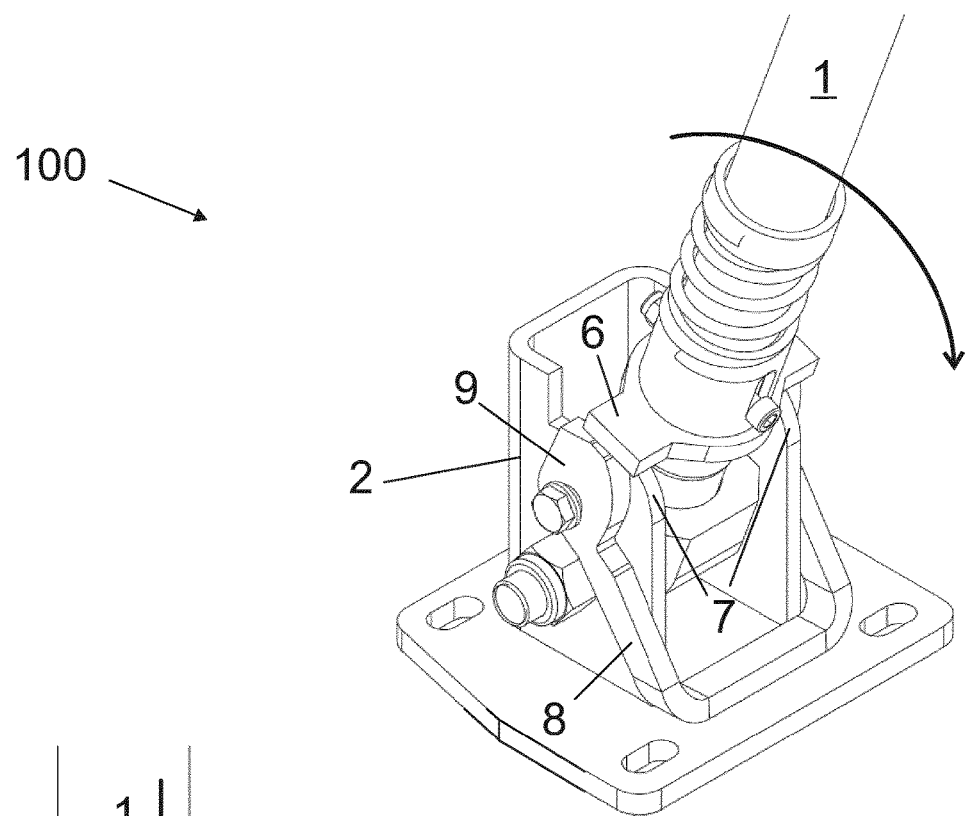
FIG. 8 is a schematic perspective view of the arrangement shown in FIG. 2 in a second position.

The embodiment shown in Figures comprises two grooves 5, two projections 6 and two guidance surfaces 7. In another embodiment, there is only one groove 5, one projection 6 and one guidance surface 7. Basically, it is preferable that the numbers of the grooves, projections and guidance surfaces are equal, but this is not compulsory. According to an idea, as the lever 8 is in its extreme position in a second direction D2 of rotation, the first end 9 thereof is arranged to limit a length L (shown in FIG. 2) of the groove 5 to a length shorter than width W (shown in FIG. 7) of the projection 6. An example of this kind of position is shown in FIG. 7. Thus the lever 8 is prohibiting the projection 6 entering in the groove 5. This may facilitate the operator's work especially when moving a safety railing 200 comprising at least two posts and arrangements 100 from a standing position to recumbent position. As the operator has lifted the projection(s) 6 away from the groove(s) 5 in one arrangement, the projection(s) will not go back spontaneously in said groove(s), but is/are supported by the first end(s) 9. Thus the operator may leave said arrangement and concentrate to operate with a next arrangement 100. This way even a very long safety railing 200 can be turned over by just one operator.

Figure 9:
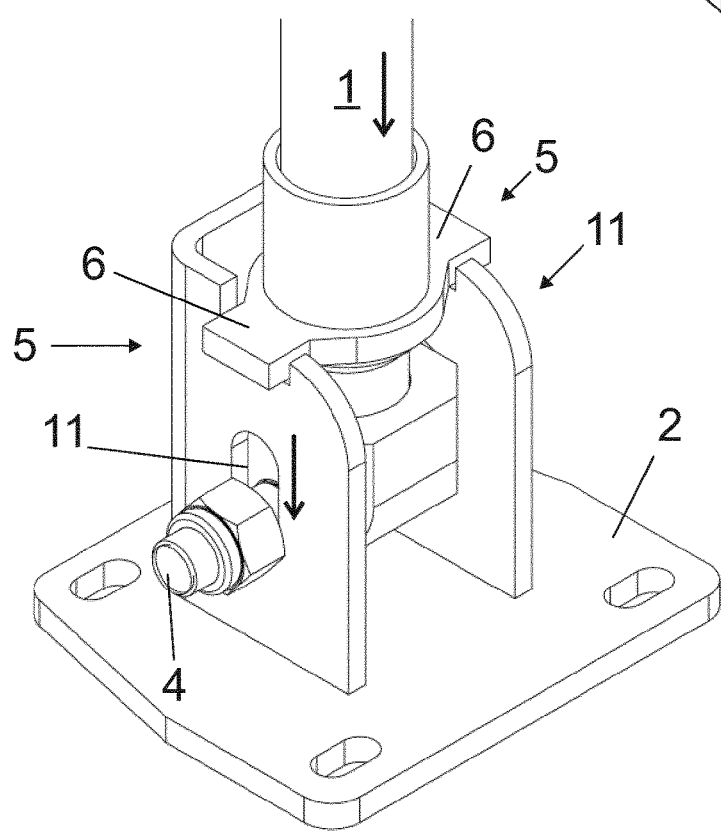
FIG. 9 is a schematic perspective view of another embodiment of the arrangement.

FIG. 9 is a schematic perspective view of another embodiment of the arrangement. In an embodiment, the projection 6 is arranged fixedly in the post 1. The stand 2 comprises vertically elongated mounting holes 11 that receives the pin 4 attached to the post 1. The pin 4 and also the post 1 may move in the mounting holes 11 in vertical direction. The guidance surface 7 lifts the projection 6, the pin 4 and the post 1 therewith such that the projection 6 enters at a corresponding groove 5, and then the projection 6 and the post 1 therewith drops in the groove 5.

Figure 10:
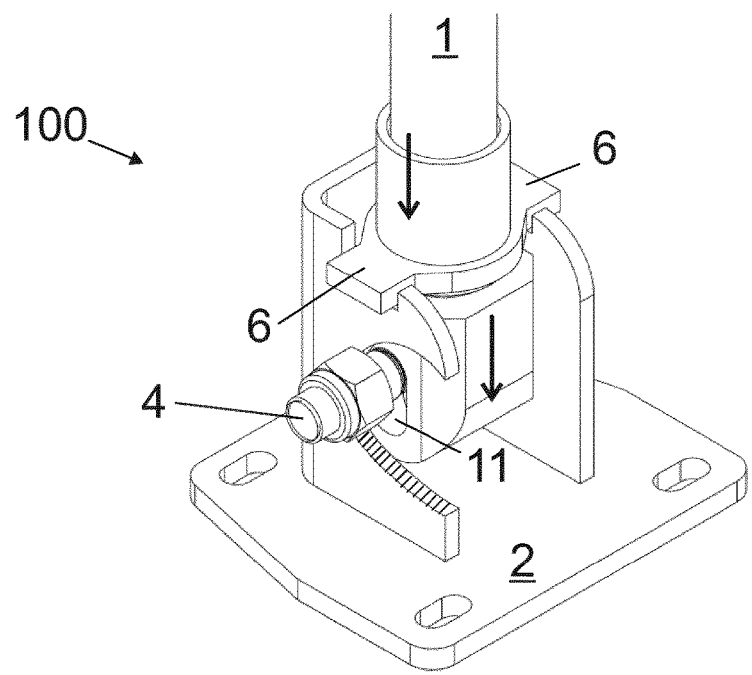
FIG. 10 is a schematic perspective view of a third embodiment of the arrangement.

FIG. 10 is a schematic perspective view of a third embodiment of the arrangement. In another embodiment, the projection 6 is arranged fixedly in the post 1. The post 1 comprises vertically elongated mounting hole 11 for receiving the pin 4 attached to the stand 2. The post 1 may move in relation to the pin 4 in direction of the elongation. The guidance surface 7 lifts the projection 6 and the post 1 therewith such that the projection 6 enters at a corresponding groove 5, and then the projection 6 and the post 1 therewith drops in the groove 5. It is to be noted that the lever 8 is not shown in FIG. 9 in order to simplify the presentation.

Figure 11:
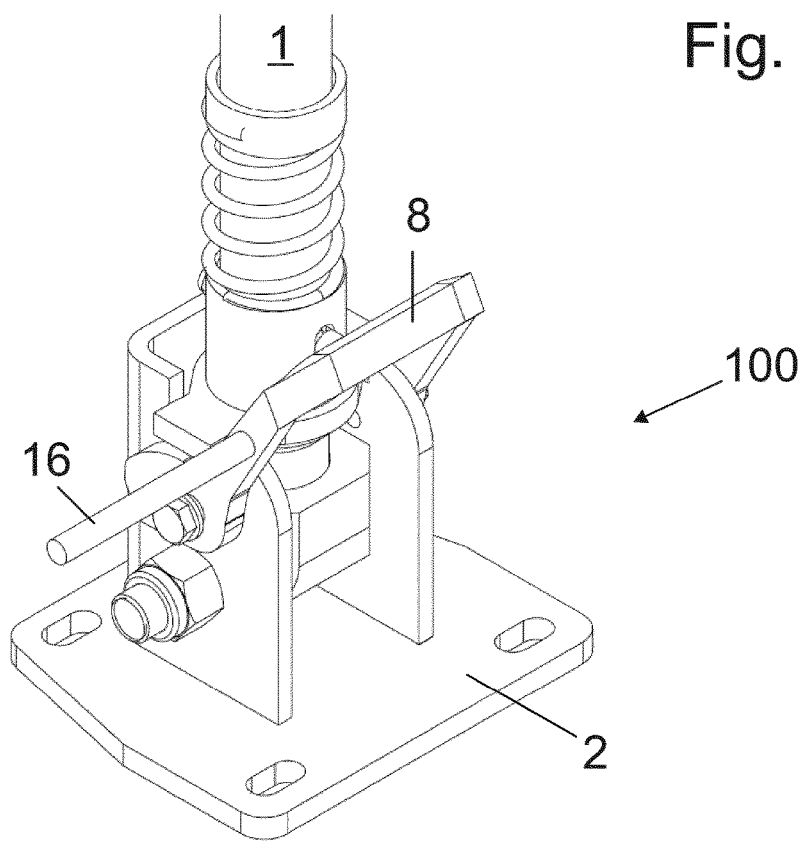
FIG. 11 is a schematic perspective view of a fourth embodiment of the arrangement.

FIG. 11 is a schematic perspective view of a fourth embodiment of the arrangement. In an embodiment, there is an extension 16 in the lever 8 that extends to an opposite side of the stand 2 as the second end 15 of the lever. Said extension 16 makes it easy to use the arrangement 100 from both sides of the safety railing 200.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 post
2 stand
3 attachment element
4 pin
5 groove
6 projection
7 guidance surface
8 lever
9 first end of lever
10 actuator
11 mounting hole
12 rear edge
13 front edge
14 connecting piece
15 second end of lever
16 extension
17 sleeve
100 arrangement
200 safety railing
B base structure
D1, D2 direction of rotation
L length of groove
P plane
V vehicle
W width of projection

The invention claimed is:

1. An arrangement attaching a falling post on a base structure, the post being rotatably movable between a standing and a recumbent position, the arrangement comprising:
a stand including an attachment element arranged for attaching the falling post to the base structure, wherein the post is attached pivotally to the stand by a pin, the post being arranged to rotate from the standing position to the recumbent position with respect to the stand, the stand having at least one groove arranged laterally with respect of the post, at least one projection extending in a lateral direction from a sleeve that is movably disposed on the post, the at least one groove being arranged with respect to the least one projection such that when the post is in the standing position, the at least one projection lies in the at least one groove, and thereby locks the post in said standing position, the at least one projection being attached to the post and arranged to move with respect to the stand in a longitudinal direction of the post, an exterior of the stand including a guidance surface ending at the at least one groove, the guidance surface being arranged to lift the at least one projection along the post and guide said projection to move into the at least one groove; and a lever rotatably attached on the stand, the lever including a first end and a length of the lever being arranged to extend past the guidance surface when the post is in the recumbent position such that the at least one projection is arranged to move on the guidance surface to push the first end of the lever and rotate the lever in a first direction therewith, and the at least one projection being arranged to push down the first end simultaneously with moving into the at least one groove, such that when the post is in the standing position the first end of the lever is situated under the at least one projection lying in the at least one groove, and wherein the lever is arranged when activated to rotate in a second direction opposite to the first direction, the first end of the lever being arranged to lift the at least one projection away from the at least one groove, thus allowing the post to be moved towards the recumbent position.

2. The arrangement as claimed in claim 1, wherein the at least one projection is arranged on the post and movable in longitudinal direction of said post.

3. The arrangement as claimed in claim 2, wherein an actuator is arranged on the post, the actuator being arranged to urge said projection towards the pin and allow said projection to be lifted by the guidance surface to move away from the pin.

4. The arrangement as claimed in claim 1, wherein the at least one groove comprises two grooves, the two grooves being arranged on opposite sides of the stand, and wherein the post includes two projections extending in opposite directions from the post.

5. The arrangement as claimed in claim 1, wherein an upper section of the guidance surface has a convex profile.

6. The arrangement as claimed in claim 1, wherein the at least one groove includes a rear edge that extends higher from a bottom of the groove than a front edge joining the guidance surface.

7. The arrangement as claimed in claim 1, wherein as the lever is in an extreme position in a second direction of rotation, the first end of the lever is arranged to lie at the at least one groove, such that said first end limits the length of the at least one groove to a length shorter than a width of the projection, the lever prohibiting the projection from entering into the groove.

8. The arrangement as claimed in claim 7, wherein the lever is dimensioned such that as the first end limits said length of the at least one groove to a length shorter than a width of the projection, a second end of the lever lies on a same side with the first end with relation to a vertical imaginary plane arranged on and parallel with a rotational pin of the lever.

9. The arrangement as claimed in claim 1, wherein the lever has two first ends and an arc-shaped connecting piece therebetween, said arc-shaped connecting piece establishing a second end of the lever.

10. The arrangement as claimed in claim 9, wherein the lever includes an extension extending to an opposite side of the stand at the second end of the lever.

11. The arrangement as claimed in claim 1, wherein the pin is arranged eccentrically with respect to the guidance surface, such that a distance of an upper part of the guidance surface from the pin is more than a distance between the pin and lower parts of said guidance surface.

12. A vehicle, comprising the arrangement as claimed in claim 1.

13. The vehicle as claimed in claim 12, wherein the vehicle is a mining vehicle, and wherein the arrangement is arranged in a safety railing of said mining vehicle.

* * * * *